United States Patent [19]

Smith

[11] 4,215,336
[45] Jul. 29, 1980

[54] APPARATUS AND METHOD FOR STABILIZATION OF A THERMISTOR TEMPERATURE SENSOR

[75] Inventor: Thomas W. Smith, Fort Myers Beach, Fla.

[73] Assignee: McNeil-Akron, Inc., Akron, Ohio

[21] Appl. No.: 896,974

[22] Filed: Apr. 17, 1978

[51] Int. Cl.² .......................... G01K 7/22; G01N 7/24; G06G 7/20
[52] U.S. Cl. ......................... 340/177 CA; 73/362 AR; 328/144
[58] Field of Search .................... 340/177 CA, 177 R, 340/189 R; 328/3, 144; 73/362 AR; 307/310

[56] References Cited

U.S. PATENT DOCUMENTS

| | | | |
|---|---|---|---|
| 3,199,354 | 8/1965 | Hornfeck | 73/36 Z |
| 3,496,338 | 2/1970 | Poitras et al. | 219/494 |
| 3,624,525 | 11/1971 | Smith | 328/3 |
| 3,663,833 | 5/1972 | Pao et al. | 328/144 |
| 3,688,581 | 9/1972 | LeQuernec | 73/362 AR |
| 3,722,283 | 3/1973 | Treharne et al. | 73/362 SC |
| 3,750,155 | 7/1973 | Oman | 340/177 CA |
| 3,766,782 | 10/1973 | Shimomura | 73/359 |
| 3,911,359 | 10/1975 | Metcalf | 328/144 |
| 3,916,180 | 10/1975 | Turtle | 328/144 |
| 3,940,703 | 2/1976 | Hekimian et al. | 328/144 |
| 4,000,454 | 12/1976 | Braki | 73/362 AR |
| 4,050,309 | 9/1977 | Junkert | 73/362 AR |
| 4,117,722 | 10/1978 | Helmsetter | 73/362 AR |
| 4,132,116 | 1/1979 | Zeeb | 73/362 AR |

*Primary Examiner*—Donald J. Yusko
*Attorney, Agent, or Firm*—Hamilton, Renner & Kenner

[57] ABSTRACT

A thermistor temperature sensor having non-linear electrical response characteristics with temperature, a material constant, beta, that varies with temperature, and providing an output signal indicative of the temperature desired to be measured is utilized herein. A time dependent signal having a configuration that offsets the non-linear temperature dependence of the sensor output signal is generated and compared to the sensor output signal. Whenever the sensor output at least equals that of the offsetting signal, a comparator generates an output signal that, after appropriate delay, is indicative of the actual temperature. The material "constant" of the sensor is maintained substantially constant over at least a substantial range of temperatures. Additionally or alternatively, the sensor is energized in such manner as to substantially eliminate self-heating induced variations in the sensor output signal.

41 Claims, 7 Drawing Figures

APPARATUS AND METHOD FOR STABILIZATION OF A THERMISTOR TEMPERATURE SENSOR

BACKGROUND OF THE INVENTION

The present invention relates generally to temperature sensing devices. More particularly, the present invention relates to temperature monitoring systems employing temperature sensors having non-linear electrical response characteristics with temperature and circuitry for linearization and stabilization of these characteristics. More specifically, the present invention concerns apparatus and method for the linearization, stabilization or substantial elimination of other deleterious non-linear variations with temperature of systems utilizing thermistor temperature sensors.

Thermistor temperature sensors have long been recognized for their utility in accurately and precisely monitoring a wide range of temperatures. The thermistor's usefulness as a temperature sensing device derives from its characteristic very large change in resistance with temperature. Unfortunately, this change is also highly non-linear, as evidenced by the following first order mathematical approximation of a thermistor's resistance with temperature:

$$R_T = R_{T_o} e^{\beta \left( \frac{1}{T} - \frac{1}{T_o} \right)} \quad (1)$$

where $R_T$ represents the thermistor resistance at any absolute temperature T; $R_{T_o}$ represents the thermistor resistance at absolute reference temperature $T_o$; and $\beta$ (also referred to as "beta") represents the thermistor material constant. Thus, in order to effectively employ a thermistor in an accurate temperature monitoring system, the circuitry utilized in association with the thermistor must be either capable of following this non-linearity or, as done in essentially all commercially practical devices, assume absolute linearity with temperature for each incremental temperature range.

Accordingly, prior art devices have developed numerous linearization techniques to insure measurement accuracy. The majority of these techniques are based upon trading precision for accuracy (or, in other words in such cases, sensitivity for linearity), by placing additional resistances in series and/or parallel with the thermistor to reduce its rate of change of resistance with temperature [i.e., the curvature of the thermistor's Resistance-Temperature (or R-T) characteristic].

One prior art reference discloses a different linearization technique in which a time variant signal, whose characteristics are the inverse of those of a non-linear temperature sensor, is periodically generated and compared with that of the sensor output. Upon coincidence in the value of the two signals the comparator emits a short pulse of constant duration. Because the two signals are the inverse of each other, a measurement of the time from the start of the comparison to the time at which both signals have equal value—the so called "intersection time"—yields a linearized indication of the sensor's temperature. Although this technique does serve to achieve a highly linearized signal with temperature, when taken by itself such a device still suffers from serious loss of accuracy and precision in measurement, and requires unnecessary, additional, complex circuitry.

One reason for these deficiencies results from the fact that the value of beta (the thermistor material constant) has been assumed to be absolutely independent of temperature in all devices employing non-linear, semiconductor temperature sensors of which I am aware. In fact, especially over a large temperature range, substantial variations in the value of beta occur, resulting in an appreciable loss of both accuracy and precision.

A second deficiency in the performance of thermistor temperature sensing devices such as that described above stems from error induced by the heat generated within the thermistor itself as the signal current passes therethrough. One approach taken by others to mitigate the effects of self-heating has involved the intermittent operation of the thermistor sensor. But such periodic energizations reduces the frequency with which temperature samplings can be made by increasing the time necessary for each measurement, as well as necessitating further complex circuitry added to the system.

This approach is not the only source of unnecessary complex, circuitry in the above offsetting signal linearization scheme. As previously explained, after the variable intersection time is reached, a coincidence pulse of constant duration is generated to terminate this period and initiate temperature computation and display. A "controller" must be provided to initiate the temperature computation and to subsequently begin a new measurement cycle. Moreover, the necessity to manually restart each such cycle severely limits the rapidity with which successive measurements can be made.

I have found several techniques and circuits for significantly improving both the accuracy and precision of temperature systems having sensors with non-linear characteristics. Generally, the present invention contemplates the utilization of a time exponential function to offset the temperature dependent exponential function characteristic of thermistor sensors described by equation (1). More specifically, I have found an extremely simple current division network which, when used in conjunction with thermistor sensor output signal amplifiers, substantially reduces or eliminates the aforementioned variations in the value of beta, regardless of temperature.

Additionally, I have found that by impressing a particular feedback signal upon the thermistor sensor in place of the conventional constant voltage power source, the power dissipated by the thermistor itself may be fixed so as to substantially avoid the self-heating phenomena without having to periodically operate the same. Beyond this, by proper selection of this feedback signal, the thermistor output signal level may be compressed to such an extent that the linear response range of a temperature measuring system having a thermistor sensor may be substantially (and, at least theoretically, infinitely) expanded beyond that of all presently known systems.

SUMMARY OF THE INVENTION

It is, therefore, an object of the invention to provide an apparatus and method for the linearization, stabilization or substantial elimination of other deleterious non-linear variations with temperature of systems utilizing thermistor temperature sensors.

It is another object of the invention to provide an apparatus and method, as above, without significantly reducing sensor sensitivity.

It is still another object of the invention to provide an apparatus and method, as above, in which linearization is achieved by generation of a time dependent signal whose configuration offsets the non-linear temperature dependence of the sensor output signal and by subsequent comparison of such time dependent offsetting signal with the temperature dependent sensor output signal substantially without loss of accuracy or precision, and without the need for additional, complex circuitry.

It is yet another object of the invention to provide an apparatus and method, as above, in which beta, the semiconductor material "constant," is maintained substantially constant over at least a substantial range of temperatures.

It is a further object of the invention to provide an apparatus and method, as above, in which variations in the sensor output signal attributable to the self-heating phenomena are substantially eliminated.

It is still a further object of the invention to provide an apparatus and method, as above, having a simple current division network which, when used in conjunction with a thermistor sensor output signal amplifier, substantially reduces or eliminates variations in beta with temperature.

It is yet a further object of the invention to provide an apparatus and method, as above, having a particular feedback signal impressed upon the thermistor sensor for substantially eliminating variations arising from the self-heating phenomena and compressing the thermistor output signal level in such a manner that the linear response range of a temperature measuring system is substantially expanded beyond that of all presently known systems.

These and other objects and advantages of the present invention over existing prior art forms will become more apparent and fully understood from the following description in conjunction with the accompanying drawings.

In general, an apparatus and method embodying the concept of the present invention includes a temperature sensor having electrical response characteristics that vary non-linearly with temperature and providing an output signal indicative of the temperature desired to be measured. A time dependent signal having a configuration that offsets the non-linear temperature dependence of the sensor output signal is generated and compared to the sensor output signal. Whenever the sensor output at least equals that of the offsetting signal, a comparator generates an output signal. The material "constant" of the sensor is maintained substantially constant over at least a substantial range of temperatures. Additionally or alternatively, the sensor is energized in such manner as to substantially eliminate self-heating induced variations in the sensor output signal.

DESCRIPTION OF A PREFERRED EMBODIMENT

Figure 1:
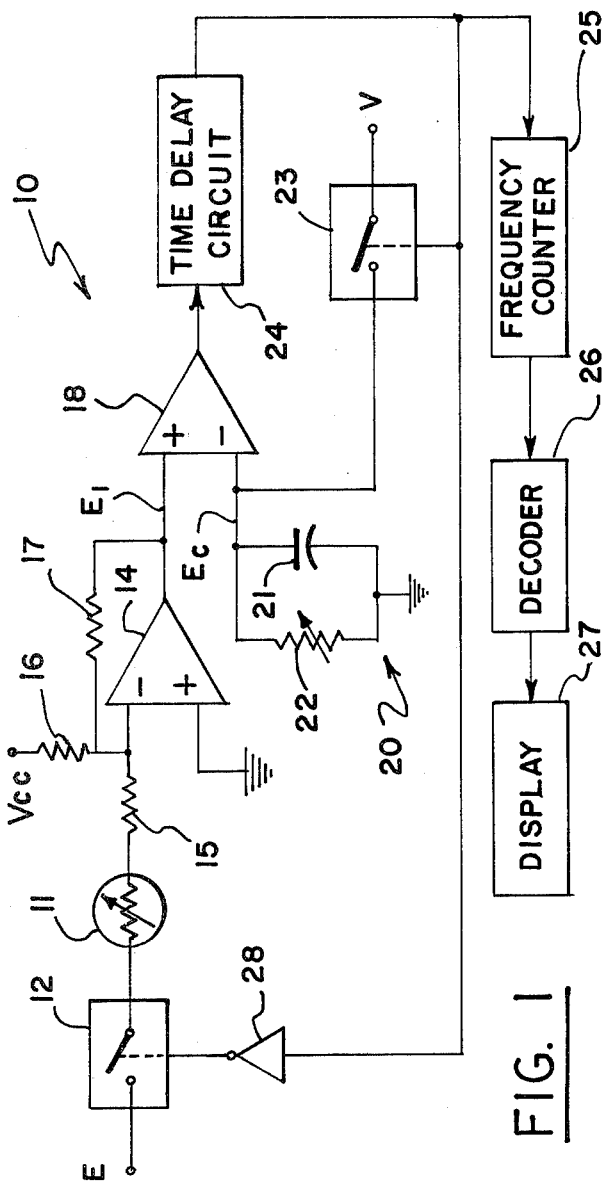
FIG. 1 is a block diagram of an exemplary thermistor temperature sensing apparatus according to the concept of the present invention in which certain elements are depicted schematically.

FIG. 1 depicts an exemplary thermistor temperature sensing apparatus according to the concept of the present invention, which apparatus is generally indicated by the numeral 10. A fixed voltage E is impressed upon and energizes a thermistor 11 through a switch 12, described further hereinafter. In order to amplify the thermistor output signal to magnitudes acceptable for further processing, the output signal from the thermistor is received by the inverting input terminal (typically indicated in the drawings by a minus sign) of a conventional operational amplifier 14 after passing through first compensating resistor 15. A fixed voltage source $V_{cc}$ is connected through a second compensating resistor 16 to the inverting input terminal of operational amplifier 14, which operational amplifier 14 has its non-inverting input terminal (typically indicated in the drawings by a plus sign) connected to ground.

Operational amplifier 14 may be connected and operated in any of the well-known differential amplifier configurations with resistive feedback between the differential amplifier output terminal and its inverting input terminal 13 provided by resistor 17. Resistor 17 may, for convenience, be selected to have a value equal to whatever reference resistance $R_{T_0}$ is desired. Again for convenience in implementation, the reference resistance $R_{T_0}$ may, in turn, be selected to have a value equal to the thermistor's measured resistance at any intermediate temperature between the desired operational temperature extremities.

The amplified thermistor output signal from operational amplifier 14, which will be hereinafter referred to as signal $E_1$, is received by the non-inverting input terminal of any conventional voltage comparator 18, such as that commercially available from National Semiconductor Corp. of Santa Clara, Calif. and identified as Model No. LM 311. Comparator 18 serves to continually compare the instantaneous voltage signal $E_1$ with the instantaneous voltage output of an RC network 20, hereinafter referred to as signal $E_c$ that is fed to the inverting input terminal of comparator 18.

RC network 20 includes a capacitor 21 and a resistor 22, either or both of which may be variable so that the network's decaying time constant, $\tau$, may be varied as explained below. In order to intermittently recharge RC network 20, a fixed voltage source V having a magnitude well above the value of $E_1$ associated with the maximum desired environmental temperature, is also connected, through an analog switch 23, to the inverting input terminal of comparator 18. Analog switch 23 may be any conventional switch having at least one pole and adequate switching speed, and capable of remote electrical control. One exemplary, suitable switch is Model No. MC 14066 manufactured by and commercially available through Motorola, Inc. of Phoenix, Arizona.

Analog switch 23 is operated by a time delay circuit 24 having a fixed time delay $t_a$, which circuit 24 receives the output signal from comparator 18. Although essentially any time delay circuit capable of inducing delays of the magnitude indicated below would be acceptable for use herein, I have found National Semiconductor's Model No. LM 322 Precision Adjustable Time Delay, readily commercially available, to be conveniently compatible with the remaining elements in apparatus 10.

Having described the fundamental elements with which the present invention functions, its operation now also may be delineated. Initially, the skilled artisan will appreciate that operational amplifier 14 generates variable voltage signal $E_1$ in direct proportion to the thermistor's instantaneous output current signal, which current signal exponentially increases with temperature as its resistance decreases. When the thermistor is placed in the environment in which measurement of the actual (also referred to as ambient) temperature is desired, its output signal would, of course, be a function of this actual temperature. Thus, operational amplifier 14's output voltage $E_1$ for any temperature T may be expressed as follows:

$$E_1 = E \epsilon^{\beta \left( \frac{1}{T_o} - \frac{1}{T} \right)} \quad (2)$$

where E is the absolute value of the constant thermistor supply voltage and $T_o$ is a reference temperature.

Signal $E_1$ is compared with the exponentially decaying voltage $E_c$ of RC network 20. RC network 20 has been found to be a simple and highly inexpensive manner of generating a time exponential function capable of accurately offsetting and thereby linearizing the temperature-dependent exponential function characteristic of thermistor sensors as stated in equation (1) above. Comparator 18 generates a single voltage pulse of short duration each time the voltage of signal $E_c$, charged to a steady-state value V that is greater than the value of $E_1$ for the maximum temperature desired, decays to equal the instantaneous voltage of signal $E_1$ at a time $t_1$. Thus, at time $t_1$, $$E_1 = E_c \quad (3)$$

Substituting equation (2) and the well-known equation representing a capacitor's voltage during discharge, $$E \epsilon^{\beta \left( \frac{1}{T_o} - \frac{1}{T} \right)} = V \epsilon^{-\frac{t_1}{\tau}} \quad (4)$$

where the time constant, $\tau$, equals the product of RC network's resistance and its capacitance. Solving for $t_1$ $$t_1 = \left[ \tau \ln \left( \frac{V}{E} \right) - \frac{\tau \beta}{T_o} \right] + \tau \beta \left( \frac{1}{T} \right) \text{SEC.} \quad (5)$$

Equation (5) represents time at which signals $E_1$ and $E_c$ are equal and comparator 18 generates an output pulse. By delaying the trailing logic transition of the output pulse from comparator 18 for a time period $t_a$, where $$t_a = \left( \frac{\tau \beta}{T_o} - \tau \ln \left( \frac{V}{E} \right) \right) \text{SEC.} \quad (6)$$

the frequency of the thusly extended pulses may be seen to be directly proportional to the absolute temperature sensed by the thermistors since $$f = \frac{1}{\text{TOTAL PERIOD}} = \frac{1}{t_1 + t_a} = \left( \frac{1}{\tau \beta} \right) T \text{ Hz.} \quad (7)$$

By appropriately selecting $\tau$ and scaling $t_a$ the output of time delay circuit 24 may be made to constitute a pulse train whose frequency is equal to the actual measured temperature in any temperature scale desired. Of course, the frequency of this output pulse train may be determined and displayed or otherwise utilized in any conventional manner. It should be noted that by any of the modifications well known to the skilled artisan, time delay circuit 24 could be made to provide an output signal having any characteristic proportional to the actual measured (i.e., ambient) temperature, rendering apparatus 10 directly compatible with whatever output device or configuration is desired.

Where, as here, the proportional characteristic is frequency, I have found it convenient to directly determine the frequency by use of a binary coded decimal (hereinafter, BCD) up/down presettable pulse counter 25, the output of which may be processed by BCD-to-7 segment decoder 26 so as to constitute a signal capable of being directly, digitally displayed by 7-segment numeric display 27.

Figure 2:
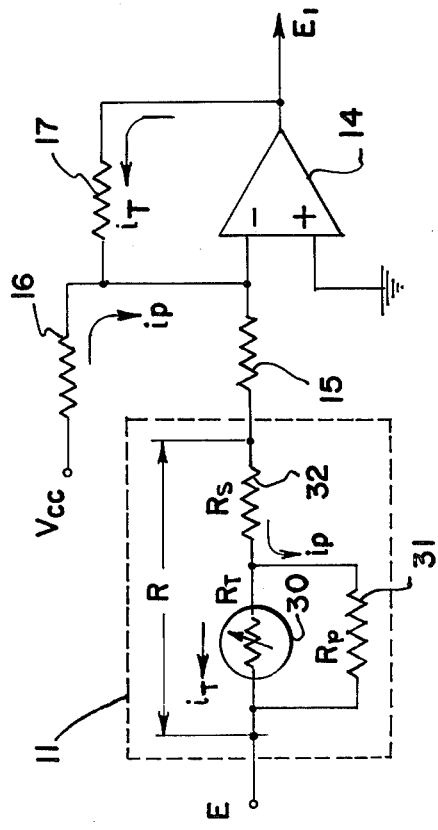
FIG. 2 is a schematic diagram of the thermistor beta stabilization circuit according to the concept of the present invention.

Apparatus 10 provides means for substantially stabilizing variations in thermistor beta with temperature. FIG. 2 illustrates that portion of apparatus 10 utilized for beta stabilization and incorporates an equivalent circuit for the actual thermistor 11. The equivalent circuit includes an ideal constant-beta thermistor element 30 having resistance $R_T$ in parallel with a resistor 31 having resistance $R_p$, both of which are in series with resistor 32 having resistance $R_S$. The resultant effective resistance of this network is designated as "R" in FIG. 2 and, by definition, equals the actual (or measured) thermistor resistance at several preselected temperatures from a minimum of $T_{min}$ to a maximum at $T_{max}$. By inspection of the equivalent circuit, the measured resistance of actual thermistor 11, $R_{TH}$, is expressed as follows:

$$R_{TH} = R = \left[ \frac{1}{\frac{1}{R_T} + \frac{1}{R_p}} \right] + R_S \quad (8)$$

From equation (1), beta may be expressed as $$\beta = \frac{\ln\left(\frac{R_{Tmin}}{R_{Tmax}}\right)}{\left(\frac{1}{T_{min}} - \frac{1}{T_{max}}\right)} \quad (9)$$

where $R_{Tmin}$ is the effective thermistor network resistance at minimum temperature $T_{min}$; and $R_{Tmax}$ is the effective thermistor network resistance at maximum temperature $T_{max}$. Finally, also from equation (1)

$$R_T = R_{Tmin} \epsilon^{\beta\left(\frac{1}{T} - \frac{1}{T_{min}}\right)} \quad (10)$$

where $R_T$ is the resistance of an ideal thermistor element at temperature T; and $R_{Tmin}$ is the resistance of an ideal thermistor element at minimum temperature $T_{min}$.

Because thermistor beta varies non-linearly with temperature, no single, unique values for $R_S$ and $R_p$ exist. Thus, in order to determine the single values for $R_S$ and $R_p$ that yield the least variation of beta throughout the desired temperature range, equations (8), (9) and (10) are preferably solved in the following manner.

After selecting the desired temperature range, the actual resistance of thermistor 11 at both the minimum and maximum temperatures may be emperically ascertained and a single value each for $R_S$ and $R_P$ arbitrarily chosen. Next the effective thermistor network resistance is calculated for both the minimum and maximum temperatures from equation (8), which in turn permits calculation of a somewhat averaged value of beta from equation (9). Finally, equation (10) is solved for $R_T$, the resistance of an ideal thermistor element, at two temperatures intermediate between the range of desired temperatures and these values compared to the effective thermistor network resistances found from equation (8). This process is repeated until those values of $R_S$ and $R_P$ that yield ideal and effective network thermistor resistances that are substantially equal are determined.

Returning to FIG. 2, both parallel resistor 31 and series resistor 32 are imaginary resistances created to account for beta variations with temperature. However, because series resistor 32 will always have a negative resistance for a thermistor temperature sensor, the effects of series resistor 32 may be canceled out by the insertion of first compensation resistor 15, a positive (real) resistance of equal magnitude. The effects of parallel resistor 31 may be cenceled by the duplication of the current division of thermistor current components $i_T$ and $i_P$ between the ideal thermistor 30 and parallel resistor 31, respectively, with a similar current division between feedback resistor 17 and second compensation resistor 16. To accomplish this, second compensation resistor 16 must be selected such that the current component $i_P$ through it (i.e., $V_{cc}/R_{16}$, where $R_{16}$ is the resistance of resistor 16), equals the current component through parallel resistor 31 (i.e., $E/R_P$). Thus, the judicious selection of the values of resistors 15 and 16 to equal those of series resistor 32, and parallel resistor 33 multiplied by ($V_{cc}/E$), respectively, substantially reduces thermistor beta variations with temperature.

In order to more readily demonstrate this, the values of $R_S$ and $R_P$ were calculated for temperatures $T_1 = 100°$ F.; $T_2 = 200°$ F.; $T_3 = 300°$ F.; and $T_4 = 400°$ F. and were found to be $-10.2 \Omega$ and $760 K\Omega$, respectively. Utilizing these temperatures and the actually measured thermistor resistances as supplied by Thermometrics, Inc. of Edison, New Jersey, Table 1 was compiled to illustrate those temperatures measured by apparatus 10 both with and without beta compensation circuitry for each twenty degree temperature increment from 100° to 440° F.

TABLE I

| Actual T (°F.) | Mfr's Value $R_{TH}(\Omega)$ | Measured-Uncompensated T(°F.) | Measured-Compensated T(°F.) |
|---|---|---|---|
| 100. | 59,851. | 102.7 | 100.00 |
| 120 | 37,980. | 121.9 | 120.30 |
| 140 | 24,746. | 141.3 | 140.35 |
| 160 | 16,519. | 160.7 | 160.25 |
| 180 | 11,277. | 180.3 | 180.12 |
| 200 | 7,860. | 200.0 | 200.00 |
| 220 | 5,580. | 219.8 | 219.94 |
| 240 | 4,034. | 239.8 | 239.92 |
| 260 | 2,967. | 259.7 | 259.90 |
| 280 | 2,215. | 279.8 | 279.94 |
| 300 | 1,678. | 300.0 | 300.00 |
| 320 | 1,289. | 320.2 | 320.05 |
| 340 | 1,003. | 340.4 | 340.07 |
| 360 | 789.9 | 360.7 | 360.06 |
| 380 | 628.7 | 381.0 | 380.05 |
| 400 | 505.6 | 401.4 | 400.00 |
| 420 | 410.5 | 421.9 | 419.90 |
| 440 | 336.3 | 442.4 | 439.70 |

It should be noted that this beta stabilization technique may be successfully applied over all temperature ranges and with all semiconductor devices exhibiting a negative exponential resistance characteristic with temperature. Moreover, other circuit configurations could be employed whereby the resistances of $R_S$ and $R_P$, being permitted to vary with temperature, would substantially reduce or eliminate beta variations with temperature over even greater ranges than that herein. However, the configuration of FIG. 2 is generally preferred because of its simplicity, relatively low cost, and excellent performance over ranges of temperatures usually more than sufficient for any particular application.

Figure 4:
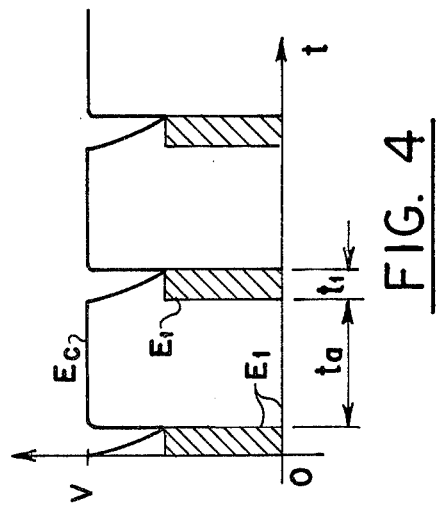
FIG. 4 is a graphical depiction of high temperature voltage waveforms at the same points in the apparatus of FIG. 1 that are illustrated in FIG. 3. Although the waveforms are coordinated in time, they are not necessarily to scale.
Figure 3:
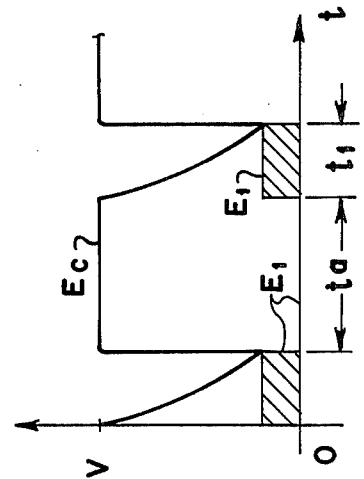
FIG. 3 is a graphical depiction of low temperature voltage waveforms at various points in the apparatus depicted in FIG. 1. Although the waveforms are coordinated in time, they are not necessarily to scale.

Beta variation isn't the only factor adversely effecting devices employing thermistor temperature sensors. Again with reference to FIG. 1, in order to minimize the deleterious effects of thermistor self-heating, after passing through logic inverter 28 the output pulse train from time delay circuit 24 also operates analog switch 12, which switch may be similar in manufacture to switch 23. This results in the thermistor power supply E being disconnected during the delay or "off" portion of each complete cycle, $t_1$ plus $t_a$, in turn causing signal $E_1$ to go to zero. As seen from the low temperature waveforms in FIG. 3 and the high temperature waveforms in FIG. 4, coordinated in time but not necessarily to scale, as the temperature becomes greater the duty cycle of the output signal from time delay circuit 24 decreases, thus causing the thermistor to operate for a proportionally shorter time (see waveform $E_1$), reducing the average power dissipated and thereby substantially reducing self-heating induced errors.

Pulsed operation of thermistor 11 will not, however, totally eliminate self-heating induced errors. Self-heating is, of course, defined as the power a device must dissipate. Thus, the power dissipated in any device, including a thermistor, at any particular temperature T may be expressed as follows:

$$P_D = \frac{E^2}{R_T} \quad (11)$$

where E equals the voltage impressed across its terminals; and $R_T$ equals its resistance at temperature T. In apparatus 10, the thermistor voltage is held constant for all temperatures. As temperature increases, thermistor resistance decreases. Thus, notwithstanding pulsed operation, self-heating must still vary with temperature, permitting self-heating induced errors to also still vary with temperature.

Figure 6:
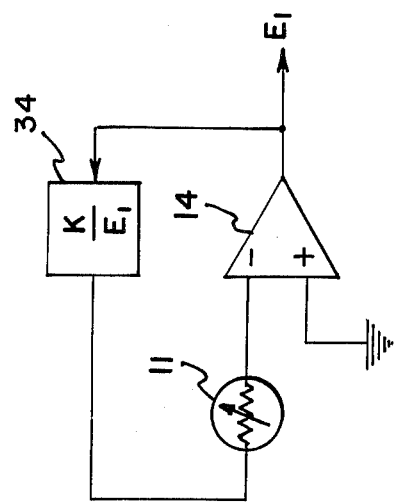
FIG. 6 is a simplified block diagram of the feedback scheme for square root compression of the thermistor output signal level shown in FIG. 5.

FIG. 6 discloses in simplified form a circuit for substantially eliminating self-heating induced variations in thermistor temperature sensing devices. In order to better understand the functioning of this circuit, the following discussion is deemed pertinent.

When temperature T equals any preselected reference temperature $T_o$, we shall define the output signal from thermistor operational amplifier 14, generally known as $E_1$, to be equal to some voltage $E_o$. Substituting these values in equation (1), the actual thermistor resistance $R_T$ becomes equal to $R_{T_o}$. Thus, from equation (11), at temperature $T_o$ the power dissipitated by thermistor 11 is:

$$P_D = \frac{E_o^2}{R_{T_o}} \quad (12)$$

In order to maintain power dissipation constant, the power dissipated by thermistor 11 at a particular temperature $T_o$ must equal the thermistor power dissipation at any temperature T. Therefore, equating equations (11) [with equation (1) substituted therein] and (12), $$P_D = \frac{E^2}{R_T} = \frac{E^2}{R_{T_o} \epsilon^{\beta\left(\frac{1}{T} - \frac{1}{T_o}\right)}} = \frac{E_o^2}{R_{T_o}} \quad (13)$$

Solving for thermistor voltage E at any temperature T we find $$E = \pm E_o \epsilon^{\left(\frac{\beta}{2}\right)\left(\frac{1}{T} - \frac{1}{T_o}\right)} \quad (14)$$

Equation (14) relates a variable voltage E impressed upon thermistor 11 for any temperature T to a reference voltage $E_o$ at a reference temperature $T_o$. For reasons which will become more evident hereinafter, it is necessary to relate the reference voltage $E_o$ to the thermistor operational amplifier 14 output signal $E_1$ for any temperature T. However, first the relationship between signals $E_1$ and E must be expressed.

From the well known voltage gain of an ideal inverting operational amplifier having an input signal E applied through an input resistor $R_T$ and the output signal $E_1$ fed back to the inverting input through a resistor $R_{T_o}$ it is known that $$E_1 = -E\left(\frac{R_{T_o}}{R_T}\right) \quad (15)$$

Inserting the values of E and $R_T$ from equations (14) and (1), respectively, $$E_1 = E_o \epsilon^{\left(\frac{\beta}{2}\right)\left(\frac{1}{T_o} - \frac{1}{T}\right)} \quad (16)$$

Rearranging and equating equations (14) and (16), and solving the same for E yields $$E = \pm \frac{E_o^2}{E_1} \quad (17)$$

Since FIG. 6 incorporates an inverting operational amplifier, $$E = -\frac{E_o^2}{E_1} \quad (18)$$

Equation (18) indicates that permitting the voltage (E) impressed upon a thermistor to vary in inverse proportion to an amplified output signal ($E_1$) of a thermistor (times some fixed constant $E_o^2$) will maintain power dissipation by the thermistor totally constant for all temperatures and completely eliminate self-heating variations in temperature measurements. More fundamentally, as seen from the $\beta/2$ term in the exponent of equations (14) and (16), operating a thermistor so as to effectively obtain half the value of its material constant, beta, yields voltage outputs that are the square root of what they would have been for any given temperature T without such operation. It is this square root compression of the resulting thermistor voltage output that underlies the results achieved by this aspect of the present invention, permitting a substantial (and theoretically infinite) expansion in the range of linearization without the deleterious effects of self-heating.

FIG. 6 presents a simplified circuit suitable for the implementation of self-heating elimination. Feedback transfer function 34 is introduced between the output of operational amplifier 14 and the input of thermistor 11. Feedback transfer function 34 may comprise any circuit capable of generating the transfer function $(-k/x)$ where x equals $E_1$, and k is made, by definition, to equal $E_o^2$.

Figure 5:
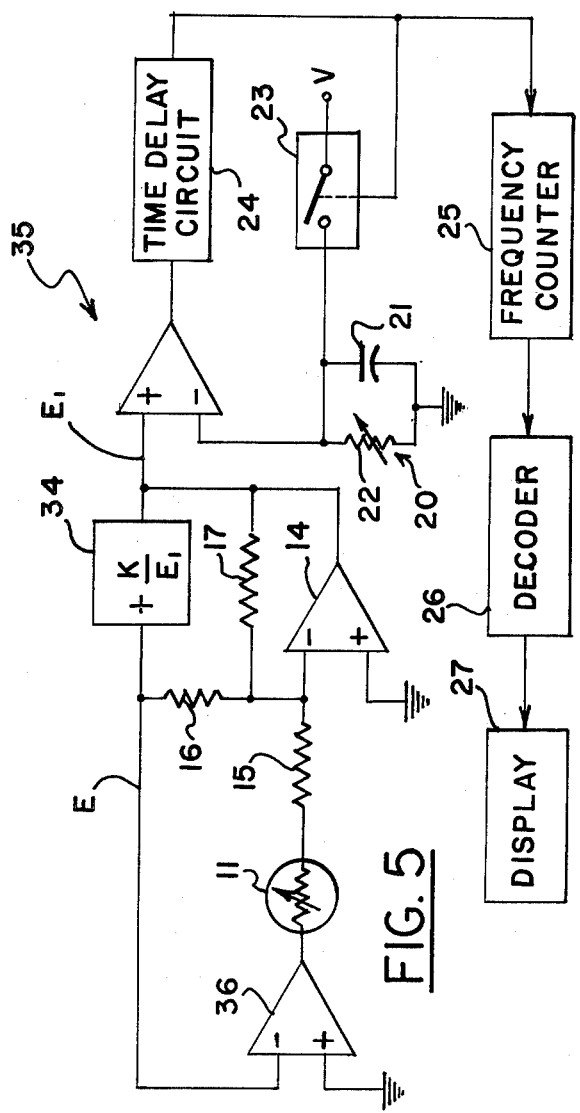
FIG. 5 is a block diagram of an exemplary thermistor temperature sensing apparatus according to the concept of the present invention and incorporating in particular a feedback scheme for square root compression of the thermistor output signal level.

FIG. 5 shows an apparatus according to the concept of the present invention incorporating both the beta stabilization of FIG. 2 and the square root compression of FIG. 6 and is generally designated by the numeral 35. Most of the elements and their interconnection in the circuit of FIG. 5 are substantially similar to that of FIG. 1. Of course, since self-heating variations are eliminated by the continual application of a particularly variable thermistor supply voltage E, thermistor's 11 supply voltage is no longer pulsed and analog switch 12 of FIG. 1 is eliminated, as is switch's 12 control signal from time delay circuit 24. Because the output signal from feedback transfer function 34 is an analog signal whose value must be negative for impression upon thermistor 11, in the event such signal is not already negative, digital logic inverter 28 is replaced by an inverting amplifier 36, which may be a conventional amplifier having unity gain and resistive feedback (not shown). Fixed voltage source $V_{cc}$ also may be eliminated, and the second compensating resistor 16 connected directly to the output of feedback transfer function 34.

Figure 7:
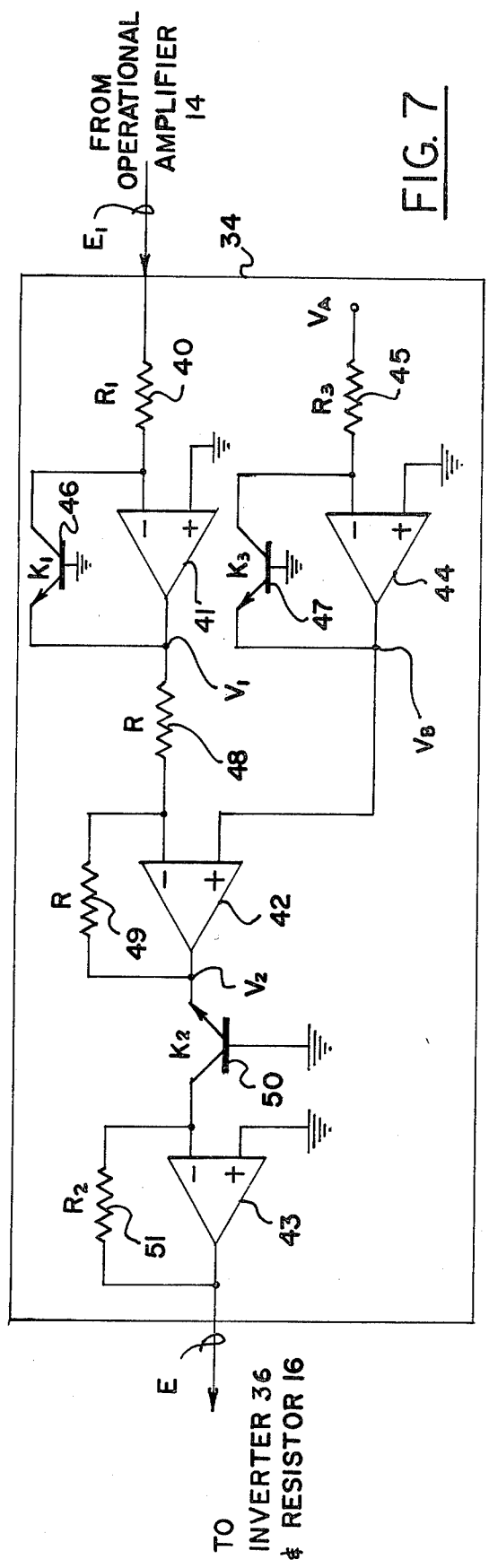
FIG. 7 is a schematic diagram of an exemplary circuit suitable for generation of an acceptable function for square root compression of the thermistor output signal level.

Although it is believed to be well within the skills of the ordinary artisan to develop numerous circuits for effectuating feedback transfer function 34, all of which must be taken to be within the spirit of the present invention, FIG. 7 depicts one such exemplary circuit. Signal $E_1$ is received, through input resistor 40 having resistance $R_1$, by the inverting input terminal of the first of four conventional, inverting operational amplifiers 41, 42, 43, and 44, amplifiers 41, 43 and 44 of which have their non-inverting input terminals connected to ground. A constant voltage $V_A$ is received, through input resistor 45 having resistance $R_3$, by the inverting input of operational amplifier 44.

The outputs of operational amplifiers 41, 44, signals $V_1$ and $V_B$, respectively, are each fed back to their respective amplifier inverting inputs through monolithic transistors 46, 47 having constants $K_1$ and $K_3$, respectively, defined below. Signal $V_1$ is received by the inverting input of operational amplifier 42 after passing through input resistor 48 having resistance R. Signal $V_B$ is directly received by the noninverting input of operational amplifier 42.

The output of operational amplifier 42, signal $V_2$, is fed back to its inverting input through resistor 49 having the same resistance R as resistor 48. Additionally, the output of operational amplifier 42 passes through transistor 50, monolithic with transistors 46 and 47, having constant $K_2$ and is subsequently received by the inverting input of operational amplifier 43. Resistor 51 having resistance $R_2$ provides feedback of the output signal from operational amplifier 43, hereinafter demonstrated to be the desired signal E, to its inverting input.

Because transistors 46, 47 and 50 are monolithic, and assuming that operational amplifiers 41, 42, 43 and 44 may be considered to be ideal, it is well known that signals $V_1$, $V_B$ and E may be expressed as follows:

$$V_1 = -\left[\frac{kT}{q} \ln\left(\frac{E_1}{K_1 R_1}\right) + G\right] \quad (19)$$

$$V_B = -\left[\frac{kT}{q} \ln\left(\frac{V_A}{K_3 R_3}\right) + G\right] \quad (20)$$

$$\ln\left(\frac{E}{K_2 R_2}\right) = -\left[\frac{q}{kT} V_2 + \frac{q}{kT} G\right] \quad (21)$$

where k equals Boltzmann's Constant; T equals the ambient absolute temperature; q equals the charge of an electron; $K_1$, $K_2$ and $K_3$ equals constants of transistors 46, 50, and 47, respectively, based upon that monolithic transistor's emitter reverse saturation current, current gain in the common base configuration utilized herein; and G equals the gap potential of the transistor's basic semiconductor material, generally silicon.

From the voltage gain relationship for ideal operational amplifiers signal $V_2$ may be expressed as follows:

$$V_1 = -V_1\left(\frac{R}{R}\right) + V_B\left(1 + \frac{R}{R}\right) = -V_1 + 2V_B \quad (22)$$

Substituting $V_1$ and $V_B$ from equations (19) and (20), respectively, yields $$V_2 = \left[\frac{kT}{q} \ln\left(\frac{E_1}{K_1 R_1}\right) + G\right] - \left[2\frac{kT}{q} \ln\left(\frac{V_A}{K_3 R_3}\right) + 2G\right] \quad (23)$$

Finally, substituting equation (23) into equation (21) and solving for E yields $$E = \frac{K'}{E_1} \quad (24)$$

where K' is defined as $$K' = K_2 R_2 \left[\frac{V_A^2 K_1 R_1}{(K_3 R_3)^2}\right] \quad (25)$$

Thus, by merely selecting the values of the constants in equation (25) such that K' equals $E_o^2$, equation (18) may be properly implemented.

From the discussion hereinabove, the operation of the elements within feedback transfer function 34 of FIG. 7 should now be more readily apparent. Initially, in order to obtain the reciprocal of signal $E_1$, $E_1$ is logarithmically amplified by operational amplifier 41 in conjunction with transistor 46. In order to eliminate the distortion in signal $E_1$ introduced by reason of variations in the operating temperature of apparatus 35 itself [as represented by the term (kT/q) in equation (19)], a constant voltage $V_A$ is introduced and logarithmically amplified by operational amplifier 44 in conjunction with transistor 47. The logarithmic output signals $V_1$ and $V_B$ from operational amplifiers 41 and 44, respectively, are summed and the difference therebetween amplified by operational amplifier 42, and the antilog taken thereof by operational amplifier 43 in conjunction with transistor 50. The value of feedback resistor 51 may be selected so as to adjust the absolute value of signal E to the desired suitable operational value. Thus, the output of operational amplifier 43 is a signal E inversely proportional to the thermistor amplifier output signal $E_1$ and independent of the operating temperature of apparatus 35.

It should be emphasized that the circuit described immediately above does not eliminate the self-heating phenomena in thermistor temperature sensors: it merely eliminates all self-heating induced errors by effectively eliminating variations induced by self-heating over a substantial, and theoretically infinite, range of temperatures. In other words, this circuit fixes the formerly variable self-heating induced offset signal to a substantially constant value. Once initially accounted for, this constant offset signal may be thereafter ignored without suffering adverse consequences. Moreover, selection of the above constants may be utilized to directly determine the value of the constant offset signal.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the thermistor temperature sensing art.

I claim:

1. An apparatus for use with a semiconductor temperature sensor having electrical response characteristics that vary non-linearly with temperature, a material constant, beta, that varies with temperature, and providing an output signal indicative of ambient temperature comprising:

means for generating a time dependent signal having a configuration that offsets the non-linear temperature dependence of the sensor output signal;

means for comparing the sensor output signal with said offsetting signal and generating an output signal whenever the sensor output signal at least equals that of said offsetting signal; and means for reducing the effective value of the material constant so as to yield a sensor output signal that is substantially reduced from what it otherwise would have been, thereby substantially extending the range of linear output from the sensor without the deleterious effects of self-heating.

2. An apparatus, as recited in claim 1, wherein said means for reducing the effective value of the material constant reduces said effective value by one-half so as to yield a sensor output signal that is the square root of what it otherwise would have been, and further including means for amplifying the sensor output signal and providing an output signal received by said means for comparing.

3. An apparatus, as recited in claim 2, wherein said means for reducing the effective value of the material constant includes means for generating a transfer function according to the relation $$E = K'/E_1$$

where E equals the voltage impressed upon the sensor; $E_1$ equals the output voltage of said means for amplifying the sensor output signal; $K'$ equals a constant proportional to the square of the sensor output signal at some reference temperature; said transfer function being received by the sensor.

4. An apparatus, as recited in claim 3, wherein the sensor is a thermistor.

5. An apparatus for use with a semiconductor thermistor temperature sensor having electrical response characteristics that vary non-linearly with temperature, and providing an output signal indicative of ambient temperature comprising:

means for generating a time dependent signal having a configuration that offsets the non-linear temperature dependence of the sensor output signal;

means for comparing the sensor output signal with said offsetting signal and generating an output signal whenever the sensor output signal at least equals that of said offsetting signal;

means for amplifying the sensor output signal and providing an output signal received by said means for comparing; and means for obtaining the square root of the sensor output signal including means for generating a transfer function according to the relation $$E = K'/E_1$$

where E equals the voltage impressed upon the sensor; $E_1$ equals the output voltage of said means for amplifying the sensor output signal; $K'$ equals a constant proportional to the square of the sensor output signal at some reference temperature; said transfer function being received by the sensor; said means for generating a transfer function including first, second, third and fourth operational amplifier means each providing output signals, said first operational amplifier means receiving said means for amplifying output signal and logarithmically amplifying the same, said second operational amplifier means receiving a constant voltage and logarithmically amplifying the same, said outputs of both said first and second operational amplifier means being received by said third operational amplifier means, said third operational amplifier means amplifying the difference between the outputs of said first and second operational amplifier means, said fourth operational amplifier means receiving said output of said third operational amplifier means and taking the antilog of said output signal from said third operational amplifier means.

6. An apparatus, as recited in claim 5, wherein said means for generating an offsetting signal includes an intermittently rechargeable RC network.

7. An apparatus, as recited in claim 4, further including: means for delaying said output signal from said means for comparing to provide an output signal proportional to the ambient temperature; and, means for processing for desired display said output signal from said means for delaying.

8. An apparatus, as recited in claim 7, wherein said output signal from said means for delaying has its frequency proportional to the ambient temperature.

9. An apparatus, as recited in claim 8, wherein said means for processing includes a frequency counter, decoder, and alphanumeric display.

10. An apparatus, as recited in claim 9, wherein said means for delaying controls the intermittent recharging of said RC network.

11. An apparatus for use with a semiconductor temperature sensor having electrical response characteristics that vary non-linearly, exponentially with temperature, a material constant, beta, that varies with temperature, and providing an output signal indicative of ambient temperature comprising:

means for generating a time dependent signal having a configuration that offsets the non-linear temperature dependence of the sensor output signal;

means for receiving the sensor output signal and stabilizing the value of beta for at least a substantial range of temperatures and providing a stabilized sensor output signal;

means for receiving said stabilized sensor output signal and comparing said stabilized sensor output signal with said offsetting signal and generating an output signal whenever said stabilized sensor output signal at least equals that of said offsetting signal, thereby reducing variations from true exponential sensor response characteristics.

12. An apparatus, as recited in claim 11, further including means for receiving and amplifying the sensor output signal and providing said stabilized sensor output signal received by said means for comparing.

13. An apparatus, as recited in claim 12, wherein said means for stabilizing the value of beta includes first, second and third resistance means for canceling beta induced sensor output signal variations with temperature.

14. An apparatus, as recited in claim 13, wherein said first and second resistance means are compensation resistors and said third resistance means is a feedback resistor, all associated with said means for amplifying.

15. An apparatus, as recited in claim 13, further including means for reducing the effective value of the material constant so as to yield a sensor output signal that is substantially reduced from what it otherwise would have been, thereby substantially extending the range of linear output from the sensor without the deleterious effects of self-heating.

16. An apparatus, as recited in claim 15, wherein said means for reducing the effective value of the material constant includes means for generating a transfer function according to the relation $$E = K'E_1$$

where E equals the voltage impressed upon the sensor; $E_1$ equals the output voltage of said means for amplifying the sensor output signal; and K' equals a constant proportional to the square of the sensor output signal at some reference temperature; said transfer function being received by said sensor.

17. An apparatus, as recited in claim 16, wherein the sensor is a thermistor.

18. An apparatus for use with a semiconductor temperature sensor having electrical response characteristics that vary non-linearly with temperature, a material constant, beta, that varies with temperature, and providing an output signal indicative of ambient temperature comprising:
 means for generating a time dependent signal having a configuration that offsets the non-linear temperature dependence of the sensor output signal;
 means for comparing the sensor output signal with said offsetting signal and generating an output signal whenever the sensor output signal at least equals that of said offsetting signal;
 means for amplifying the sensor output signal and providing an output signal received by said means for comparing;
 means for stabilizing the value of beta for at least a substantial range of temperatures including first, second and third resistance means for canceling beta induced sensor output signal variations with temperature; and
 means for obtaining the square root of the sensor output signal including means for generating a transfer function according to the relation.

$$E = K'/E_1$$

where E equals the voltage impressed upon the sensor; $E_1$ equals the output voltage of said means for amplifying the sensor output signal; and K' equals a constant proportional to the square of the sensor output signal some reference temperature; said transfer function being received by said sensor; said means forgenerating a transfer function including
 first, second, third and fourth operational amplifier means each providing output signals, and first operational amplifier means receiving said means for amplifying output signal and logarithmically amplifying the same, said second operational amplifier means receiving a constant voltage and logarithmically amplifying the same, said outputs of both said first and second operational amplifier means being received by said third operational amplifier means, said third operational amplifier means amplifying the difference between the outputs of said first and second operational amplifier means, said fourth operational amplifier means receiving said output of said third operational amplifier means and taking the antilog of said output signal from said third operational amplifier means.

19. Apparatus, as recited in claim 18, wherein said means for generating an offsetting signal includes an intermittently rechargeable RC network.

20. An apparatus, as recited in claim 16, further including: means for delaying said output signal from said means for comparing to provide an output signal proportional to the ambient temperature; and, means for processing for desired display said output signal from said means for delaying.

21. An apparatus, as recited in claim 20, wherein said output signal from said means for delaying has its frequency proportional to the ambient temperature.

22. An apparatus, as recited in claim 21, wherein said means for processing includes a frequency counter, decoder, and alphanumeric display.

23. An apparatus, as recited in claim 22, wherein said means for generating an offsetting signal includes an intermittently rechargeable RC network, said means for delaying controlling the intermittent recharging of said RC network.

24. An apparatus for use with a temperature sensor having electrical response characteristics that vary non-linearly with temperature and providing an output signal indicative of ambient temperature comprising:
 means for supplying power to the sensor;
 means for generating a time dependent signal having a configuration that offsets the non-linear temperature dependence of the sensor output signal;
 means for comparing the sensor output with said offsetting signal and generating an output signal whenever the sensor output signal at least equals that of said offsetting signal; and,
 means intermittently discontinuing and re-establishing electrical continuity between the sensor and said means for supplying power thereby minimizing self-heating induced variations in the sensor output signal.

25. An apparatus, as recited in claim 24, wherein the temperature sensor is a thermistor having some material constant, beta, that varies with temperature, and further including means for receiving the sensor output signal and stabilizing the value of beta for at least a substantial range of temperature and providing a stabilized sensor output signal, said means for comparing receiving said stabilized sensor output signal.

26. An apparatus, as recited in claim 25, further including means for receiving and amplifying the sensor output signal and providing said stabilizing sensor output signal received by said means for comparing.

27. An apparatus, as recited in claim 26, wherein said means for stabilizing the value of beta includes first, second and third resistance means for canceling beta induced sensor output signal variations with temperature.

28. An apparatus, as recited in claim 24, wherein said first and second resistance means are compensation resistors and said third resistance means is a feedback resistor, all associated with said means for amplifying.

29. An apparatus, as recited in claim 26, wherein said means for generating an offsetting signal includes an intermittently rechargeable RC network.

30. An apparatus, as recited in claim 24, further including means delaying said output signal from said means for comparing to provide an output signal proportional to the ambient temperature; and, means for processing for desired display said output signal from said means for delaying.

31. An apparatus, as recited in claim 30, wherein said output signal from said means for delaying has its frequency proportional to the ambient temperature.

32. An apparatus, as recited in claim 31, wherein said means for processing includes a frequency counter, decoder, and alphanumeric display.

33. An apparatus, as recited in claim 32, wherein said means for generating an offsetting signal includes an intermittently rechargeable RC network, said means for delaying controlling both the intermittent recharging of said RC network and said means for intermittently discontinuing and re-establishing electrical continuity.

34. An apparatus for use with a semiconductor temperature sensor having electrical response characteristics that vary non-linearly with temperature, and providing an output signal indicative of ambient temperature comprising:
   means for generating a time dependent signal having a configuration that offsets the non-linear temperature dependence of the sensor output signal;
   means for comparing the sensor output with said offsetting signal and generating an output signal whenever the sensor output signal at least equals that of said offsetting signal; and
   means for impressing a supply voltage upon the sensor such that power dissipation is maintained substantially constant, thereby substantially eliminating self-heating induced variations in the sensor output signal.

35. A method of sensing temperature with a semiconductor temperature sensor having electrical response characteristics that vary non-linearly with temperature, a material constant, beta, that varies with temperature, comprising the steps of:
   placing the sensor in the environment in which measurement of the actual temperature is desired;
   energizing the sensor such that an output signal indicative of the actual temperature is provided by the sensor; and,
   stabilizing the value of beta for at least a substantial range of temperatures.

36. A method, as recited in claim 35, further including the step of amplifying the output of the sensor by use of an amplifier, said step of stabilizing including the step of selecting the value of the resistances associated with said amplifier so as to cancel beta induced sensor output signal variations with temperature.

37. A method, as recited in claim 36, further including the step of reducing the effective value of the material constant so as to yield a sensor output signal that is substantially reduced from what it otherwise would have been, thereby substantially extending the range of linear output from the sensor without the deleterious effects of self-heating.

38. A method, as recited in claim 37, wherein said step of reducing the effective value of the material constant includes means for generating a transfer function according to the relation $$E = K'/E_1$$

where E equals the voltage impressed upon the sensor; $E_1$ equals the output voltage of said means for amplifying the sensor output signal; and K' equals a constant proportional to the square of the sensor output signal at some reference temperature; said transfer function being received by said sensor.

39. A method of sensing temperature with a semiconductor temperature sensor having electrical response characteristics that vary non-linearly with temperature, a material constant, beta, that varies with temperature, comprising the steps of:
   placing the sensor in the environment in which measurement of the actual temperature is desired;
   energizing the sensor such that an output signal indicative of the actual temperature is provided by the sensor; and
   reducing the effective value of the material constant so as to yield a sensor output signal that is substantially reduced from what it otherwise would have been, thereby substantially extending the range of linear output from the sensor without the deleterious effects of self-heating.

40. A method, as recited in claim 39, further including the step of amplifying the output of the sensor by use of an amplifier, said step of reducing the effective value of the material constant including the step of generating a transfer function according to the relation $$E = K'/E_1$$

where E equals the voltage impressed upon the sensor; $E_1$ equals the amplifier output signal; and K' equals a constant proportional to the square of the sensor output signal at some reference temperature; said transfer function being received by the sensor.

41. A method of sensing temperature with a semiconductor temperature sensor having electrical response characteristics that vary non-linearly with temperature, a material constant, beta, that varies with temperature, comprising the steps of:
   placing the sensor in the environment in which measurement of the actual temperature is desired;
   energizing the sensor such that an ouput signal indicative of the actual temperature is provided by the sensor; and
   impressing a supply voltage upon the sensor such that power dissipation is maintained substantially constant, thereby substantially eliminating self-heating induced variations in the sensor output signal.

* * * * *

UNITED STATES PATENT AND TRADEMARK OFFICE
CERTIFICATE OF CORRECTION

PATENT NO. : 4,215,336
DATED : July 29, 1980
INVENTOR(S) : Thomas W. Smith

It is certified that error appears in the above-identified patent and that said Letters Patent are hereby corrected as shown below:

Column 7, line 51, the word "cenceled" should read --canceled--.

Column 12, line 20, the "=" sign should have a "Δ" symbol directly above it.

Column 15, line 63, the word "and" should be the word -- said --.

Claim 26, column 16, line 58, the word "stabilizing" should read --stabilized--.

Signed and Sealed this

Twenty-fourth Day of March 1981

[SEAL]

Attest:

RENE D. TEGTMEYER

Attesting Officer — Acting Commissioner of Patents and Trademarks